No. 778,627.

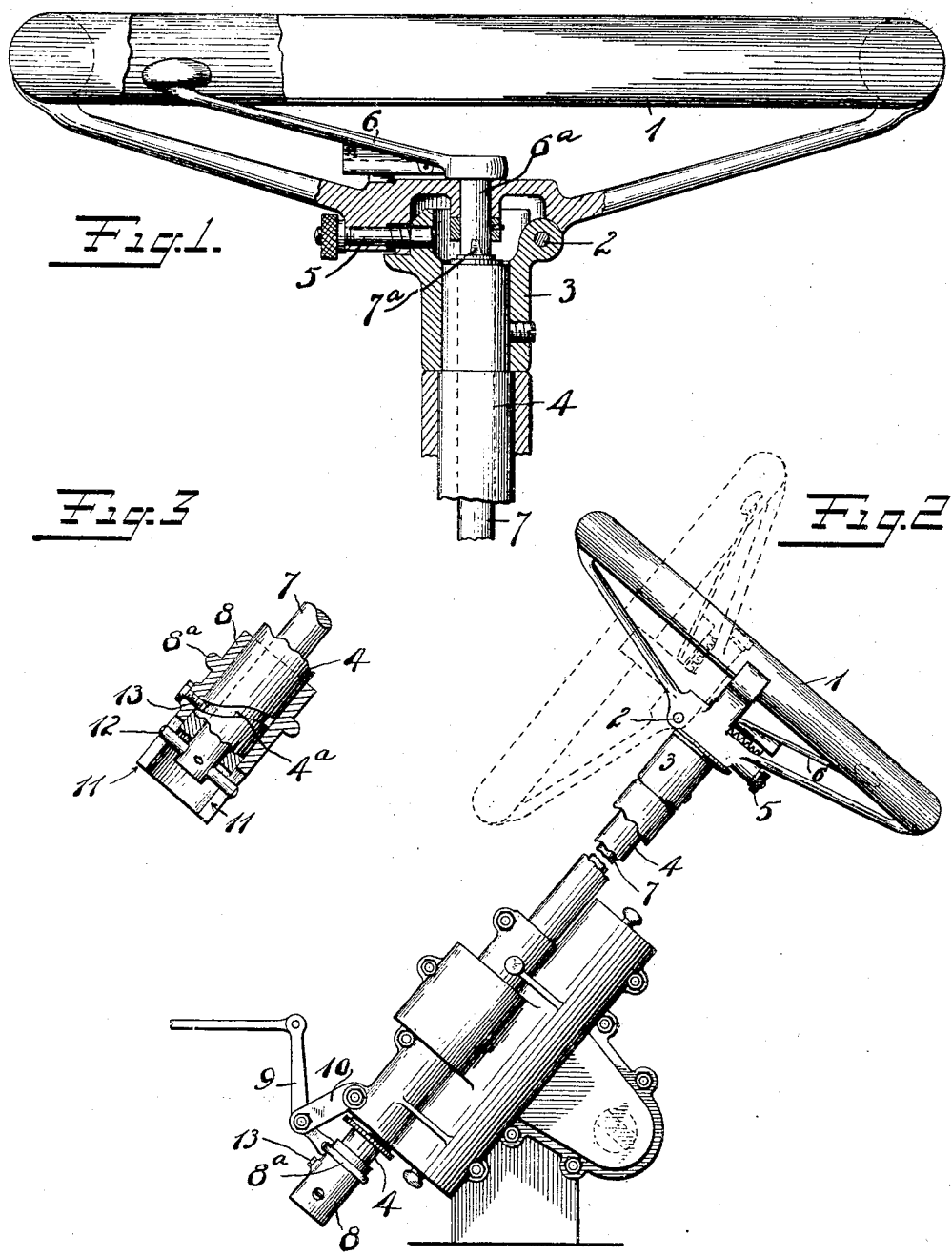

Patented December 27, 1904.

UNITED STATES PATENT OFFICE.

FRED H. BOGART, OF NEW BRITAIN, CONNECTICUT, ASSIGNOR TO THE CORBIN MOTOR VEHICLE CORPORATION, OF NEW BRITAIN, CONNECTICUT, A CORPORATION OF CONNECTICUT.

AUTOMOBILE CONTROLLING MECHANISM.

SPECIFICATION forming part of Letters Patent No. 778,627, dated December 27, 1904.

Application filed September 20, 1904. Serial No. 225,173.

*To all whom it may concern:*

Be it known that I, FRED H. BOGART, a citizen of the United States, residing at New Britain, in the county of Hartford, State of Connecticut, have invented certain new and useful Improvements in Automobile Controlling Mechanism, of which the following is a full, clear, and exact description.

My invention relates to certain new and useful improvements in automobiles, and particularly to a controlling mechanism.

In the drawings, Figure 1 is a side elevation of a controlling wheel and lever with adjacent parts in section. Fig. 2 is a side elevation. Fig. 3 is a side elevation, partly in section, of certain details of construction.

1 is a steering-wheel for controlling the course of the vehicle, said wheel being hinged at 2 upon a head 3, secured to a shaft 4, which may lead to any suitable form of steering mechanism.

5 is a spring-catch carried by the hub of the wheel 2 and arranged to engage with the head 3 when the wheel is in its normal operative position. By withdrawing the catch 5 from the head 3 the wheel may be tilted, for example, from the position shown in solid lines, Fig. 2, to that shown in dotted lines. Rotatably mounted upon the hub of the wheel 2 is a controlling-lever 6, the handle end of which is conveniently located relatively to the hand of the user while in the act of steering the vehicle. This lever 6 carries a short shaft $6^a$, which in the particular form shown is slotted at the lower end to overstand a flattened projection $7^a$ on the end of shaft 7, which leads through shaft 4 to the controlling apparatus. The projection $7^a$ may extend diametrically across the end of the shaft 7 and is located in such a position relatively to the hinge 2 of wheel 1 that the short shaft $6^a$ is readily disconnected from or connected to the shaft 7 when the wheel is tilted up or down.

The shaft 7 passes entirely through the steering-shaft 4, as seen in Fig. 3. In the lower end of the shaft 4 is a spiral groove $4^a$. Rotatably mounted upon this end of shaft 4 is a sleeve 8, having an external annular rib $8^a$. This rib projects into the slotted end of a lever 9, pivoted on a bracket 10 and to which lever a rod may connect leading to that part of the motor which it is desired to control.

From the foregoing it will be seen that if the sleeve 8 is shifted up or down upon its support 4 the end of the lever 9 will be swung to or fro. It will also be apparent that the rotation of the sleeve-supporting shaft 4 will not disturb the longitudinal adjustment of the sleeve thereon, and hence the position of the lever 9 will not be changed thereby. To shift the position of the lever 9, it is necessary to move the sleeve 7 up or down upon its support 4, and this is accomplished by shifting the angular position of the lever 6 relatively to the wheel 2. The lower end of the sleeve 8 projects below the end of the shaft 4, and in said lower end one or more slots 11 11 are formed. In the projecting lower end of the shaft 7 is located a lateral projection or pin 12, which extends into said slots 11 11.

13 is a pin carried by the sleeve 8 and projecting into the spiral groove $4^a$ on the sleeve-supporting shaft 4. When the angular position of the shaft 7 is altered relatively to the shaft 4 by the turning to lever 6, it rotates the sleeve 8 to a corresponding extent upon its support, and since the pin 13 moves in the spiral groove $4^a$ it results in a longitudinal shifting of the sleeve 8. This, as before indicated, changes the angle of the lever 9, which in turn controls any desired part of the motor, whatever that may be.

What I claim is—

1. In an apparatus of the character described, a hollow shaft, a second shaft extending therethrough projecting below the lower end thereof, a sleeve mounted on the lower end of the hollow shaft and spirally movable thereon, a sliding connection between the said sleeve and said inner shaft whereby when the angular position of said shafts is varied the sleeve will be shifted longitudinally upon its support.

2. In an apparatus of the character described, a hollow shaft, a second shaft passing therethrough and projecting below the lower end thereof, a sleeve mounted on the lower end of said hollow shaft, a spiral groove upon the surface of said supporting-shaft, a projection on the inner side of said sleeve extending into said groove, a sliding connection between said inner shaft and said sleeve whereby by shifting the angular position of said shafts said sleeve is moved longitudinally upon its support, an annular external projection on said sleeve and a lever coacting therewith and controlled thereby.

3. In an apparatus of the character described, a hollow shaft, a second shaft extending therethrough projecting below the lower end thereof, a sleeve mounted on the lower end of the hollow shaft and spirally movable thereon, a sliding connection between the said sleeve and said inner shaft whereby when the angular position of said shafts is varied the sleeve will be shifted longitudinally upon its support, a controlling-wheel mounted on the upper end of said hollow shaft and a controlling-lever adjacent said wheel and connected with said inner shaft.

4. In an apparatus of the character described, a hollow shaft, a second shaft extending therethrough projecting below the lower end thereof, a sleeve mounted on the lower end of the hollow shaft and spirally movable thereon, a sliding connection between the said sleeve and said inner shaft whereby when the angular position of said shafts is varied the sleeve will be shifted longitudinally upon its support, a controlling-wheel hinged to said outer shaft, means for locking said wheel in its operative position relatively thereto, a lever centrally mounted upon the hub of said wheel and arranged to tilt therewith and disconnecting means between said lever and said inner shaft.

Signed at New Britain, Connecticut, this 15th day of September, 1904.

FRED H. BOGART.

Witnesses:
M. S. WIARD,
C. E. RUSSELL.